Figure 1:
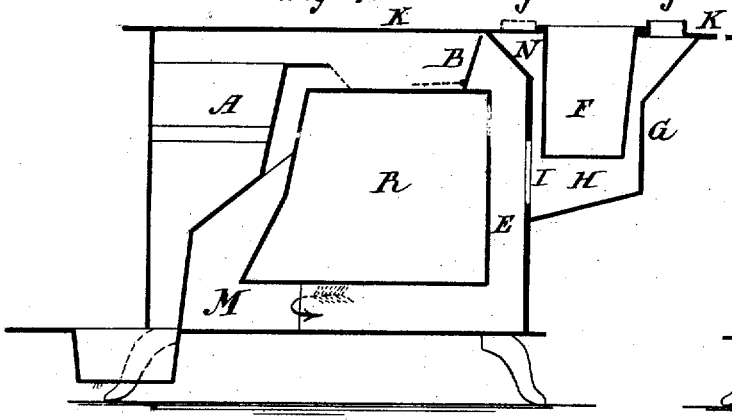

5 Sheets--Sheet 1.

R. M. HERMANCE.

Cooking-Stoves.

No. 5,554. Reissued August 26, 1873.

Witnesses:
G. W. Browne
Chas. Raettig

Inventor:
Albert Wilkinson
Assignee of
Richard M. Hermance.

N. PETERS, PHOTO-LITHOGRAPHER, WASHINGTON, D. C.

R. M. HERMANCE.

Cooking-Stoves.

No. 5,554 Reissued August 26, 1873.

Witnesses:

G. W. Browne

Chas. Raettig.

Inventor:

Isaac R. Washburn

Assignee of

Richard M. Hermance.

N. PETERS, PHOTO-LITHOGRAPHER, WASHINGTON, D. C.

R. M. HERMANCE.

Cooking-Stoves.

No. 5,554. Reissued August 26, 1873.

Witnesses:
G. W. Browne
Chas. Rastig

Inventor:
Joseph R. Wilkinson
Assignee of
Richard M. Hermance

N. PETERS, PHOTO-LITHOGRAPHER, WASHINGTON, D. C.

5 Sheets--Sheet 4.

R. M. HERMANCE.

Cooking-Stoves.

No. 5,554.

Reissued August 26, 1873.

Witnesses:

G. F. Rowe

Chas. Raettig.

Inventor:

Joseph B. McKinson
Assignee of
Richard M. Hermance

N. PETERS, PHOTO-LITHOGRAPHER, WASHINGTON, D. C.

R. M. HERMANCE.

Cooking-Stoves.

No. 5,554. Reissued August 26, 1873.

*Witnesses:*

G. W. Browne

Chas. Raettig.

*Inventor:*

Isaac S. Wilkinson

Assignee of

Richard M. Hermance.

N. PETERS, PHOTO-LITHOGRAPHER, WASHINGTON, D. C.

UNITED STATES PATENT OFFICE.

RICHARD M. HERMANCE, OF TROY, NEW YORK, ASSIGNOR, BY MESNE ASSIGNMENTS, TO JOSEPH B. WILKINSON, OF SAME PLACE.

IMPROVEMENT IN COOKING-STOVES.

Specification forming part of Letters Patent No. 102,462, dated April 26, 1870; reissue No. 5,554, dated August 26, 1873; application filed August 2, 1873.

*To all whom it may concern:*

Be it known that RICHARD M. HERMANCE, of Troy, county of Rensselaer and State of New York, invented an Improvement in Cooking-Stoves, of which the following is a specification:

The invention that forms the subject of this patent relates to that class of cook-stoves in which the oven is heated by currents of hot air or the heated products of combustion traversing the back-plate and the bottom thereof, such stoves being ordinarily denominated "diving-flue" cook-stoves. The invention consists, in general terms, in connecting with the exterior of such stoves, as ordinarily constructed, an incased water-reservoir, so constructed and arranged, whether above or below the top plate, that the waste heat of the stove—*i. e.*, the caloric remaining in the products of combustion after they have performed their usual work of heating the oven and the various vessels and implements set in and over the pot-holes of the stove—may be utilized for heating the contents of such reservoir, the hot air and gases being for this purpose brought into immediate contact with the walls of the reservoir within such casing, and no further change being made in the ordinary construction of the stove itself than such as is necessary to adapt it to a reservoir thus constructed and arranged. It also consists in constructing and arranging a water-reservoir behind the oven of an ordinary cook-stove in such a manner that the contents thereof may be heated at pleasure without, at the same time, heating the oven by the passage underneath the latter of the hot-air currents. It consists, further, in providing a cook-stove of the ordinary construction with a chamber or casing upon its exterior adapted to receive within its walls a water-reservoir, such casing being made to conform substantially to the shape of the inclosed reservoir, but with an air-space left between their respective walls, which serves in large measure to prevent the loss of heat by radiation, the casing at the time serving to protect the metal of the reservoir from injury during transportation or use.

Prior to this invention various methods had been devised of constructing and arranging water-reservoirs upon the exterior of cook-stove both above and below the top plate, which thus, in addition to and without interfering with their ordinary use for cooking purposes, could be made to furnish a constant supply of heated water for various domestic uses; but all these prior constructions, although some of them are valuable improvements in the manufacture, were more or less imperfect in certain particulars, which imperfections it is the object of the present invention to remedy.

Where, for instance, the attached reservoir was of the "low-down" order—*i. e.*, was placed either entirely or largely below the plane of the top plate of the stove—no means existed whereby it could be heated independently of the oven—a valuable feature in a reservoir cook-stove, both because of the greater rapidity with which the contents of the reservoir can thus be raised to the desired temperature, and because this can be effected with a considerable saving of fuel, and, what is specially desirable in hot weather, without so highly heating the surrounding air of the room as would otherwise be necessary. The same objection existed in that class of stoves in which the oven and the reservoir were made to occupy a common space, inclosed within the four walls of the general structure. In various of such earlier stoves, again, the reservoir was so located upon the exterior as to interfere with the perfect heating of the oven when it was attempted to use the latter. The plan of the present invention is, when using the reversed draft, first to heat the oven thoroughly at top, rear, and bottom, and afterward bring the products of combustion in contact with the reservoir, thus using the waste heat, and that alone, for heating the reservoir, without in any appreciable degree modifying the action of the currents upon the oven.

The method here shown of causing the products of combustion to act upon the reservoir is believed to be superior to that employed in the principal reservoir cook-stoves before in use, in that provision is made for exposing to the action of the gases a larger surface of metal. By incasing the reservoir the heated products of combustion may be made to envelop the reservoir upon the bottom and all its sides, which will produce more efficient action than if the contact were upon the bottom or upon one side only of the reservoir. The casing, which surrounds the reservoir upon the bottom and all the sides, serves to protect the reservoir from injury, and thus permits its walls to be made of such thinness as to be the more readily acted upon by the heated gases.

Figure 2:
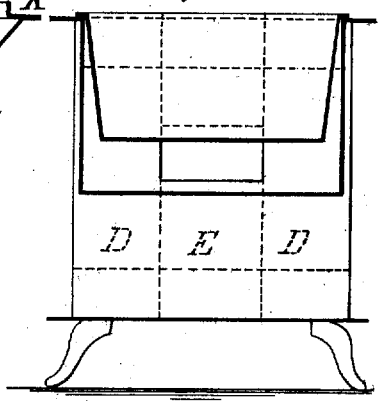
Figure 3:
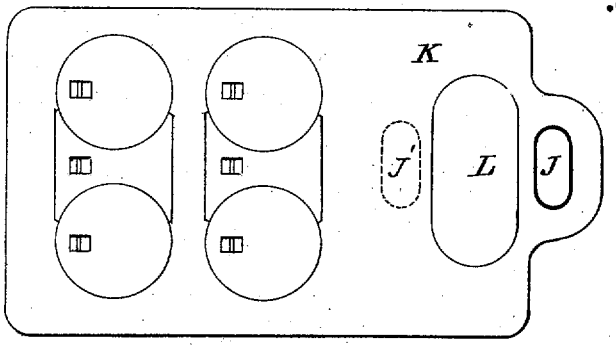
Figure 5:
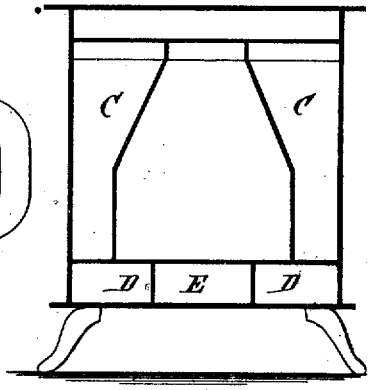
Figure 4:
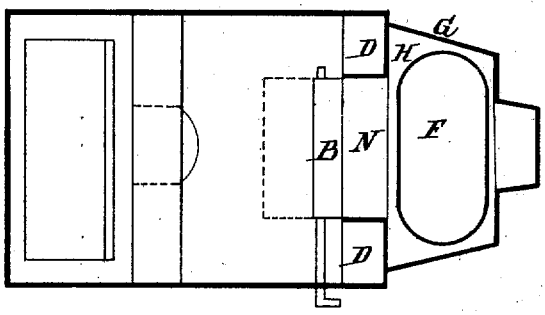

Referring to the drawings hereto attached, Figures 1, 2, 3, 4, and 5 represent a diving-flue cook-stove, constructed with two descending and an ascending flue in rear of the oven, and two descending flues in front of the same, and provided with an incased water-reservoir located upon the exterior of the rear vertical wall and between the plane of the lower oven-plate and the top plate of the stove. Fig. 1 is a central longitudinal vertical section of the stove; Fig. 2, a transverse vertical section through the reservoir and its casing, showing also a rear elevation of the stove, with the rear and bottom flues and the aperture in the back-plate indicated by dotted lines; Fig. 3, a plan view of the stove; Fig. 4, a plan view of the stove, with the top plate removed; and Fig. 5, a transverse vertical section, showing the descending flues in front of the oven.

In these figures, A is the fire-place; B, the damper controlling the direct passage to the exit-pipe; C C, the descending flues in front of the oven; D D, the two descending flues behind the oven, passing under the oven from the rear toward the front; E, the middle ascending flue; F, the water-reservoir, located behind the rear vertical plate of the stove; G, the casing surrounding the bottom and sides of the reservoir; H, the chamber formed by such casing around the reservoir; I, the aperture in the rear-wall of the stove, communicating between the reservoir-chamber and the middle ascending flue; J, the pipe-collar that receives the exit-pipe; K, the top plate of the stove; R, the oven; and L, the aperture through which access is had to the reservoir. When the damper is thrown forward into the position shown by the dotted lines, the products of combustion pass directly to the middle rear flue, thence through the aperture I into the chamber H, and thence out through the exit-pipe placed at the top of the casing and behind the reservoir. In this case, as the products of combustion escape at the exit-pipe without passing under the oven, the reservoir only will be heated, the oven remaining comparatively unaffected. When, however, the damper is raised so as to close the passage to the middle flue, the hot-air currents divide above the oven, a part passing down the two flues in front, and a part down the rear descending flues. These several currents reunite in the space M, whence they pass through the middle and ascending flue to the aperture I, and thence into the chamber surrounding the reservoir. By this process the oven is thoroughly heated upon the top, front, rear, and bottom; and afterward the products of combustion are still further utilized by bringing them in contact with the water-reservoir in such a way as to extract from them, for heating the contents of such reservoir, the largest possible amount of the caloric still remaining.

Figure 6:
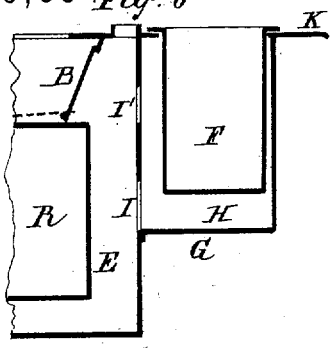

Instead of placing the exit-pipe behind the reservoir, it may, if preferred, be placed in front thereof, as shown at J′. When the exit-pipe is thus located, the direct draft may still be made to pass through the reservoir-chamber by bending forward the top of that portion of the back plate of the stove which is opposite to the middle flue, as shown at N in Figs. 1 and 4. If, however, when the pipe-collar is placed in front of the reservoir, the back plate of the stove be not thus inclined forward, but the exit-pipe be made to lead directly out from the middle flue, the products of combustion, with a direct draft, will pass off at once without entering the reservoir-chamber; and with a reserved draft—*i. e.*, when the currents are caused to pass under and around the oven—the reservoir will be heated, not, as before, by the direct impingement upon it of the hot-air currents, striking it in their immediate path, but by the hot air that flows into the chamber through the aperture I, and, consequently, envelops the reservoir. When the exit-pipe is thus arranged, the heating of the reservoir may be facilitated by providing more than one aperture of communication between its inclosing-chamber and the middle flue. Such a construction is shown in Fig. 6, which is a central longitudinal vertical section of an ordinary three-flue stove provided with an incased reservoir after the manner of this invention, there being two openings from the rear middle flue into the reservoir-chamber. As the products of combustion in their ascent, after having heated the rear and the bottom of the oven, reach the opening I, a portion of them will expand laterally and fill the space around the reservoir. These will quickly pass off again through the upper aperture I′, but only to be succeeded by fresh supplies of the outgoing gases, each imparting its proper increment of heat to the walls of the reservoir, and, through them, to the contents within.

If preferred, the entire back plate, opposite the middle flue and extending from the bottom of the casing to the top plate of the stove, may be removed, which will give the utmost freedom to the movements of the heated gases in their entrance to and egress from the reservoir-chamber.

Figure 7:
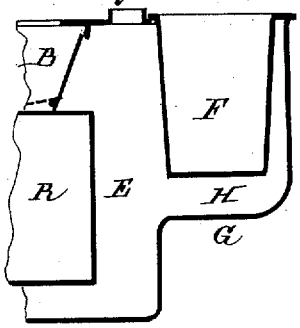
Figure 8:
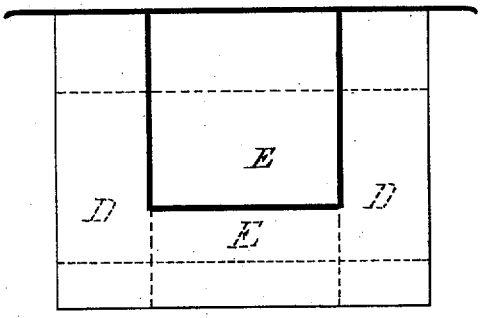

Fig. 7 is a vertical longitudinal section of an ordinary three-flue stove, thus constructed as regards the mode of heating an incased reservoir located upon the exterior of its rear vertical wall; Fig. 8 being a rear elevation of the stove, with the reservoir and its casing removed, the flue system of the stove being indicated by the dotted lines.

There are peculiar advantages attending each of these two modes of bringing the hot-air currents in contact with the walls of the incased reservoir, shown, respectively, in Fig. 1 and in Figs. 6 and 7. In the former case, inasmuch as the exit-pipe, whether placed before or behind the reservoir, leads out from the chamber immediately surrounding the reservoir, the latter can be heated by a direct draft, whenever desired, without heating the oven. This, as already indicated, is, in itself considered, a feature of large value, as there are many occasions when it is desirable not to heat the oven, but to concentrate all the heat of the stove upon the tank containing the water. Where, on the other hand, the exit-pipe communicates with the flue-space directly behind the rear oven-plate, as shown in Figs. 6 and 7, a better draft can be obtained when kindling the fire, since the ascensional power of the heated gases is in no degree impaired (as must necessarily be the case in such a construction as is shown in Fig. 1) by extended contact with the walls of a vessel containing a body of cold water. This, in turn, is a feature of no inconsiderable importance, as a perfect draft in starting the fire is always a desirable object. To offset this advantage it becomes impossible to heat the reservoir by the direct draft; and even with the reversed draft it may not be as quickly heated as where the currents are compelled to pass through the surrounding chamber; but, for most domestic purposes, it is believed that this construction will be found amply sufficient to heat the requisite quantity of water to the desired temperature, and, in so doing, to constitute a marked improvement upon former constructions.

Figure 9:
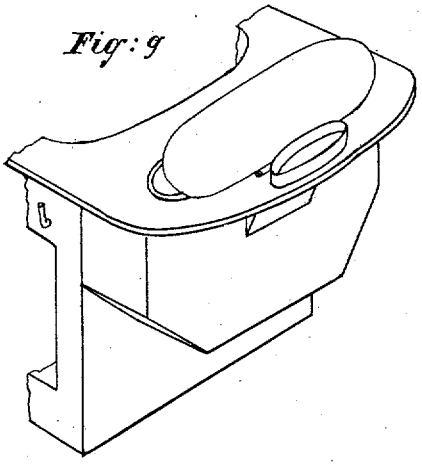
Figure 10:
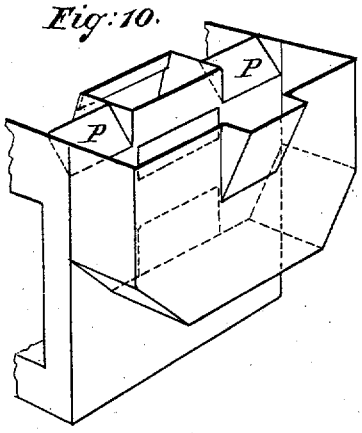
Figure 11:
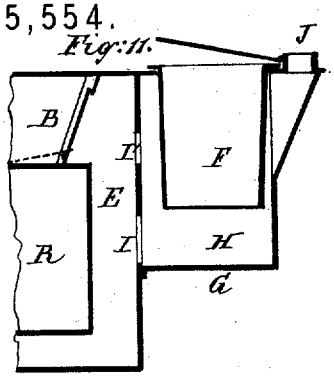
Figure 12:
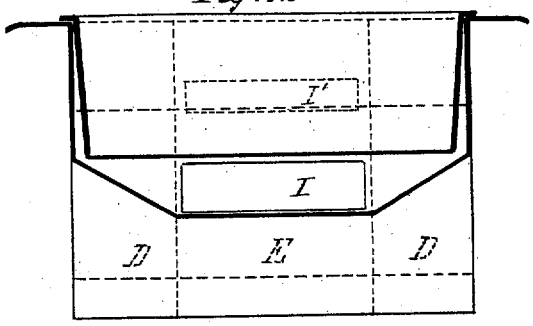
Figure 13:
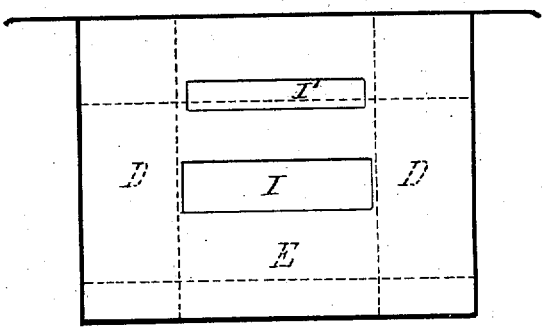

Figs. 9, 10, 11, 12, 13, and 14 represent an ordinary three-flue stove, having an incased reservoir constructed upon the exterior of its rear vertical wall, the exit-pipe being placed in rear of the ressrvoir, and two openings being made in the back plate of the stove between the reservoir-chamber and the middle flue. Fig. 9 is a perspective view of the back part of the stove with the incased reservoir attached. Fig. 10 is a perspective view of the same, the top plate being first removed and the reservoir being taken out of the casing. Fig. 11 is a vertical longitudinal section of the stove; Fig. 12, a transverse vertical section through the reservoir and casing, showing also a rear elevation of the stove, in which the various positions of the flues and the openings in the back plate are indicated by dotted lines; Fig. 13, an elevation of the rear vertical wall, showing the opening more distinctly, the flues again being indicated by dotted lines; and Fig. 14, a plan of the stove and reservoir attachment having the top plate removed.

Fig. 6, before referred to, represents the same construction, except the exit-pipe is located in front of the back plate and directly over the middle flue.

Figure 14:
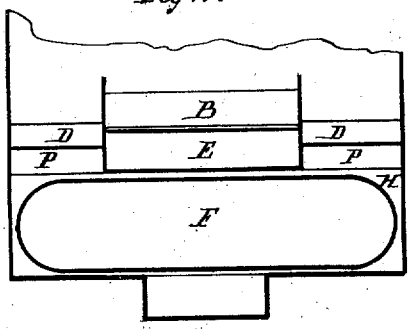

In Figs. 10 and 14 the upper portion of the rear plate of the stove proper is shown as inclined forward in those parts, P P, which are opposite the two descending flues. This arrangement is particularly intended for the protection of the upper portion of the reservoir from injury by becoming too highly heated, a precaution that is specially necessary in view of the fact, that frequently the upper part of the reservoir contains no water, while at the same time it is a part peculiarly exposed to injury, since, in the prevailing condition of the stove—*i. e.*, when the central damper is closed—the gases, in entering the descending flues, being then in their most highly-heated state, impinge directly upon the highest portion of those parts of the back plate which are opposite to such flues. By inclining these forward, as shown, and thus increasing their distance from that part of the reservoir, which, by reason of the not infrequent low condition of the water, is specially liable to injury from overheating, this danger may be, in large measure, obviated.

Figure 15:
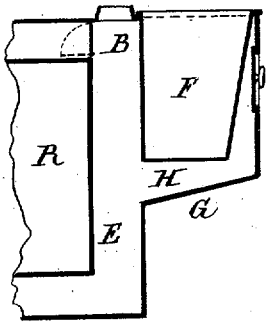
Figure 16:
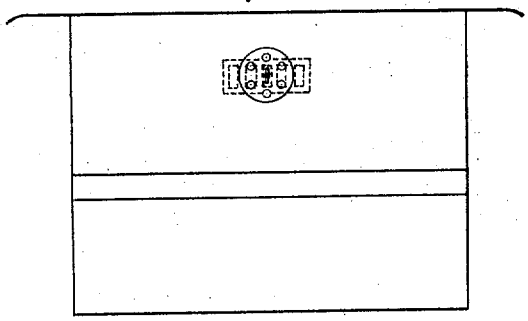
Figure 18:
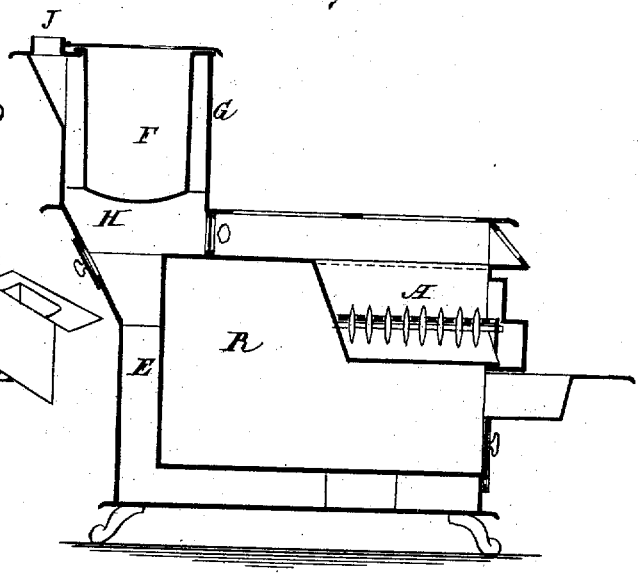

Figs. 15 and 16 show the casing of the reservoir provided with a check-damper for reducing the excess of heat, when desired, by admitting to the chamber a supply of cold air. It may be either a revolving or a sliding damper, as indicated by the full and the dotted lines, respectively, in Fig. 16. A check-damper for a similar purpose is also shown in Fig. 18.

Fig. 15 likewise shows a different mode from that of Fig. 11 of supporting the reservoir, it being, in this instance, sustained by its flange, which rests not upon an extended rim forming an extension of the top plate of the stove, but upon the top of the walls of the casing itself.

The remaining figures of the accompanying drawings relate more particularly to a modification of the incased water-reservoir, in which the reservoir, instead of being set down into a chamber beneath the extended top plate of the stove, is elevated above such top plate, being, at the same time so located at the rear of the stove as not to interfere with the use of the top of the stove proper for ordinary culinary purposes.

Figure 17:
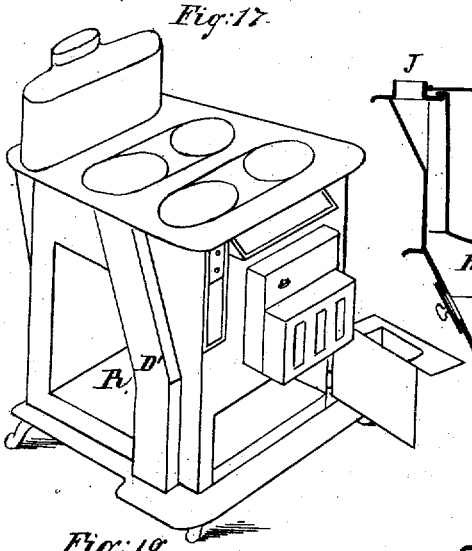

Fig. 17 is a perspective view of a diving flue cook-stove having an elevated incased water-reservoir, the reservoir being supported by its flange, which rests upon the vertical walls of the casing, and the exit-pipe being connected with the top of the casing at the back of the reservoir, so that, at all times, the products of combustion will pass through the surrounding chamber. The descending flues of this stove are placed one at each side of the stove at D′, the only flue at the rear being that through which the gases ascend to enter the reservoir-chamber. This reservoir can, if desired, be heated without heating the oven; but the stove has no direct draft except through the reservoir-chamber. When the oven is in use the products of combustion pass under it and across its back, thus completing their work of heating the oven before coming in contact with the reservoir. By thus elevating the reservoir above the top plate of the stove the space below the reservoir and behind the stove may be utilized for other purposes; but the elevated position of the reservoir is somewhat inconvenient so far as regards the work of filling it or of taking water from it. This inconvenience does not exist in reservoirs of the "low-down" order, whose top is on a level, or nearly so, with the top plate of the stove.

Figure 19:
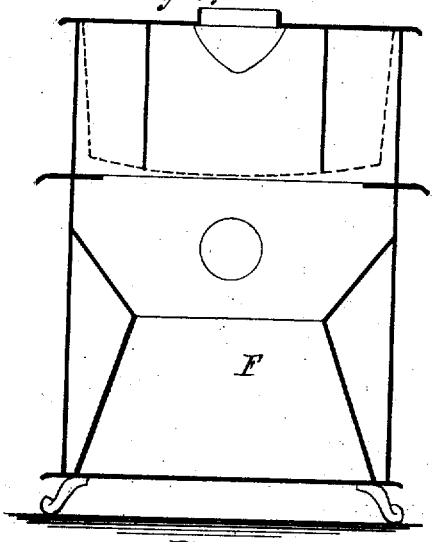
Figure 20:
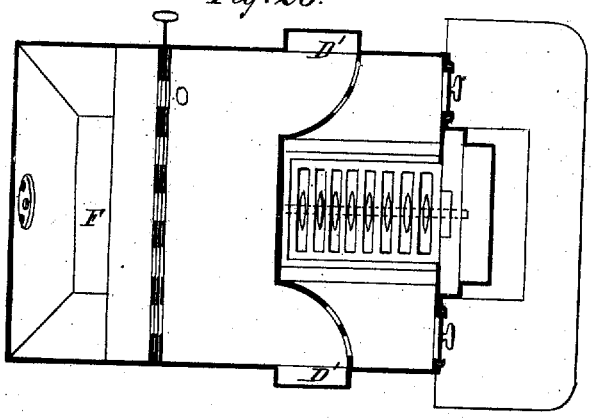
Figure 21:
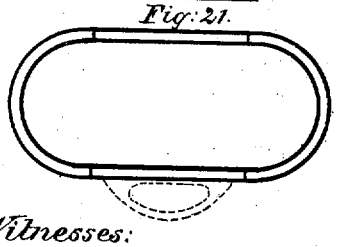

Fig. 18 is a vertical longitudinal section of the same stove shown in Fig. 17; Fig. 19, a vertical transverse section through the reservoir and rear flue; Fig. 20, a plan of the stove with the top plate thereof removed; Fig. 21, a horizontal section of the reservoir and its casing, showing the position of the strips or flanges attached to the walls of the reservoir for the purpose hereinafter indicated; and Figs. 22 and 23, perspective front and rear views of the reservoir with the strips attached.

Figure 24:
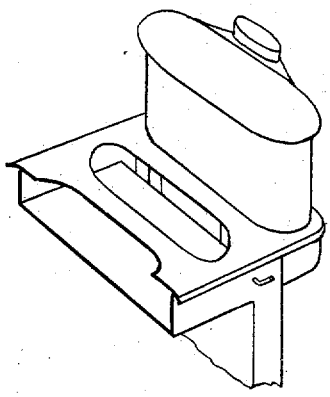
Figure 25:
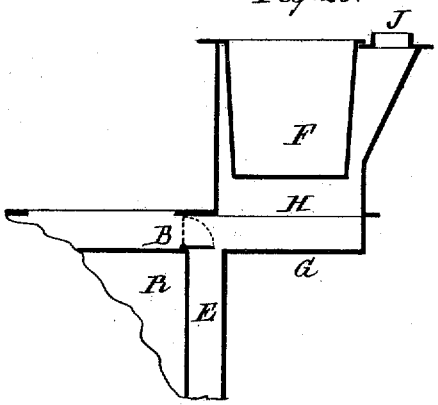
Figure 26:
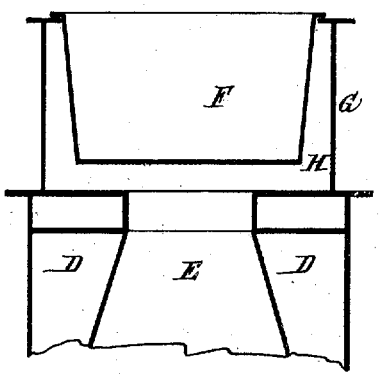
Figure 27:
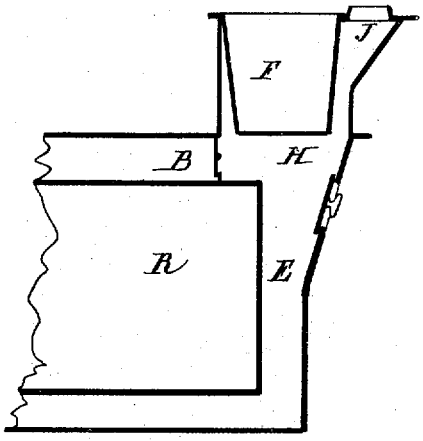

Figs. 24, 25, and 26 show an incased water-reservoir placed at the rear and above the top plate of an ordinary diving-flue stove in which both the ascending flue and the descending flues are located behind the oven. The position of the reservoir is such that the front wall of the casing is is nearly on a line with the rear wall of the stove —in this respect differing slightly from the construction shown in Figs. 18 and 27, in which, for the sake of securing a more direct impact of the hot-air currents upon the bottom of the reservoir, it is thrown a little farther forward, yet not so as to interfere materially with the use of the top of the stove for other and ordinary purposes. Fig. 27 is a sectional view of a three-flue stove with an elevated incased reservoir, showing a slightly-modified form of the back plate. In Figs. 18 and 20 is shown a sliding damper, O, extending across the entire top of the oven. By regulating the position of their damper with reference to the apertures which it controls the supply of heated gases admitted directly to the reservoir-chamber may be regulated at will, and at the same time, of course, the heating of the oven will be correspondingly affected.

It will, of course, be understood that in all cases the reservoir attached to the stove, as hereinbefore described, is to be provided with a cover to prevent the escape of steam into the room. Instead of attaching the cover directly to the reservoir itself, as in the case of ordinary boilers, it may be attached to or supported on any convenient part of the reservoir-casing, as shown in Fig. 11, in which case it should be so hinged as to lift up in a vertical direction, when it is desired to obtain access to the reservoir, which is a more convenient construction than where it is pivoted to the casing, so as to move in a horizontal direction parallel with the top of the reservoir-casing.

Where the cover is pivoted so as to swing in a horizontal direction, it must either swing inward toward the middle of the top plate or outward beyond the top plate. In the one case it would be inconvenient, as occupying space upon the stove needed for other purposes; in the other case it would be inconvenient, as interfering with the free movements of a person about the stove, and, furthermore, would be much more liable to be broken off than a cover which is hinged so as to be raised up in substantially a vertical direction.

From the foregoing description it will be understood that the invention in question relates more particularly to providing a water-reservoir, properly located, with a casing, and to the means by which the heated products of combustion may be introduced into such casing for the purpose of heating the reservoir, the mode of attaching the casing to the stove being a matter of comparatively small importance.

The casing, when placed below the top plate, may be attached to the ordinary rear vertical wall of the stove, provided with the proper apertures, by any of the usual means adapted thereto, which are employed for attaching two metallic structures together; or, if preferred, the back plate of the stove may be so formed in casting as to provide a chamber within it, but behind the position of the back plate as ordinarily made. Such a construction is shown in Fig. 7.

When the reservoir is situated above the top plate of the stove, as shown in Figs. 18 and 27, it is supported by its flange, which rests upon the top of the walls of the casing. When, however, the reservoir is of the "low-down" order, the preferred mode of supporting it is to extend the top plate of the stove over the reservoir-chamber, and to rest the flange of the reservoir upon the edges of the aperture made in such extension for permitting the reservoir to be set down into its chamber. Instead, however, of providing a support for the reservoir by thus extending the top plate, it may be made to rest directly upon the walls of the casing, when suitably constructed therefor, the flange being made of sufficient width to entirely close the chamber at the top, as is shown more particularly in Figs. 7 and 15.

Figure 22:
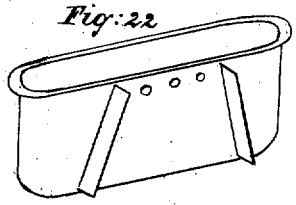
Figure 23:
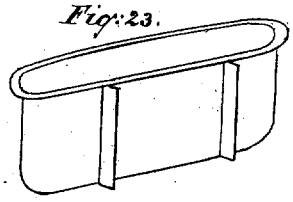

The outside of the reservoir may, if desired, be provided with flanges or division strips, standing out at right angles thereto, and of such width that when the reservoir is within the casing the strips will fit closely against the walls thereof, as shown in Figs. 21, 22, and 23, thereby performing the twofold function of furnishing a lateral support to the reservoir and dividing up the space between the reservoir and the casing, so as to confine the principal action of the hot-air currents to those portions of the reservoir where they will produce the most marked effect. This is particularly shown in the construction represented by Figs. 18 and 21, in which the exit-pipe is placed between the two strips on the rear wall of the reservoir, as a consequence of which the products of combustion, on debouching into the reservoir-chamber, spread themselves out in contact with the entire bottom of the reservoir, where they act with the greatest efficiency, the main body of the current, however, being again contracted so as to pass between the flue-strips, before mentioned, to the exit-pipe. At the same time enough of the products of combustion will expand laterally and vertically from the main current into the spaces around the other parts of the vertical walls of the reservoir to keep them filled with a body of heated air, which serves, as already indicated, to prevent the cooling of the water by radiation, which would take place rapidly were it not for the envelope of non-conducting material by which the reservoir is thus surrounded.

It will also be the case in constructions, such as are shown in Figs. 11 and 27, that the main force of the current will expend itself directly only on the bottom and back wall of the reservoir, while at the same time the space in front of the reservoir and around its ends will be constantly filled with hot air, which will expand laterally and vertically into it from the main current, serving, as above, to check the loss of heat by radiation, and it may be actually increasing to some degree the temperature of the water within. A similar action takes place in the construction shown in Fig. 1, when the pipe-collar is placed in front of the reservoir, the main action of the currents in this case being upon the bottom and the front wall of the reservoir. Not only does the incasing of the reservoir thus serve to surround it with an envelope of highly non-conducting nature, by which the loss of heat by radiation is largely prevented, but the casing also protects the metal of the reservoir from injury, to which, being located externally upon the stove, it is specially liable during transportation. From the protection thus afforded it in its exposed position, it further results that it will be less exposed to injury in use, and, therefore, will endure for a longer period than would be the case with an uncased reservoir.

Perforations may be provided in the wall of the reservoir near its upper edge, as shown in Fig. 22, through which the steam that is generated within may discharge itself into the reservoir-chamber, and thus be carried off into the uptake. This is designed, with the aid of a tight-fitting cover over the reservoir, to prevent the escape of steam into the room.

What is hereby claimed is—

1. In a cook-stove, a water-reservoir located at the rear thereof, behind the ordinary rear flue-space, in combination with a flue or flues that first carry the products of combustion under and against the bottom and the back of the oven, completing the heating of the oven before they are brought in contact with the reservoir.

2. In a diving-flue cook-stove, a water-reservoir located at the rear thereof, behind the ordinary rear flue-space, and provided with a casing into which the products of combustion may enter, in combination with a flue or flues that carry the heated products of combustion into contact both with the bottom and the back of the oven, and with the reservoir.

3. In a diving-flue cook-stove, a water-reservoir located at the rear thereof, behind the ordinary rear flue-space, in combination with a flue through which the heated products of combustion may be made to pass from the top sheet-flue of the stove into contact with the reservoir, and thence to the exit-pipe, without being carried under the oven, substantially as described.

4. In combination with a cook-stove, a water-reservoir located at the rear thereof, behind the ordinary rear flue-space, and provided with a casing through which the products of combustion may be made to pass without heating the oven.

5. A water-reservoir located upon the exterior of a cook-stove above the top plate thereof, and provided with a casing, into which the products of combustion enter on their way to the exit-pipe, after having heated the oven.

6. In combination with a stove, a water-reservoir located at the rear thereof, and provided with a casing, into which the products of combustion may enter, the front wall of such casing being formed by the rear end plate of the stove.

7. In a diving-flue cook-stove, a water-reservoir located at the rear thereof, in combination with a downward and upward draft-flue, through which the heated products of combustion descending behind the oven may change to an upward direction, and pass off to the exit-pipe, thus heating the reservoir without passing under the oven.

8. In combination with a cook-stove, an incased water-reservoir supported directly upon the vertical walls of its casing, such casing in turn being attached to or cast as a part of the walls of the stove.

9. A water-reservoir located behind the ordinary rear flue-space of a cook-stove, and provided with a hot-air casing, the top of which is formed by an extension of the top plate of the stove, which also serves to support the reservoir, substantially in the manner shown and described.

10. In combination with a cook-stove, an incased water-reservoir, the top of which is closed by a cover hinged to the casing, substantially in the manner shown and described, so that it may be lifted up from the aperture in the top of the casing when it is desired to obtain access to the reservoir.

11. In combination with an incased water-reservoir upon a cook-stove, a check-damper for admitting cool air to the hot-air chamber surrounding the reservoir, substantially as set forth.

12. The back-plate of a cook-stove, provided with a reservoir chamber or casing upon its exterior face, the walls of such casing being cast continuous with the back plate itself.

13. A cook-stove provided with an incased water-reservoir located at the rear thereof, the ordinary rear end plate of the stove forming one side of such casing, and being supplied with proper apertures above the lower oven-plate to admit the heated products of combustion into the reservoir-chamber.

14. In combination with a water-reservoir located at the rear of a cook-stove and behind the ordinary flue-space, an exit-pipe arranged in rear of such reservoir, substantially as described.

15. In combination with an incased water-reservoir partition-strips between the reservoir and its casing for guiding and controlling the movement of the heated products of combustion within the reservoir-chamber.

JOSEPH B. WILKINSON.

Witnesses:
G. W. BROWNE,
B. A. SMITH.